United States Patent
Kitamura

(10) Patent No.: US 6,950,435 B2
(45) Date of Patent: Sep. 27, 2005

(54) COMMUNICATION DEVICE AND BANDWIDTH MANAGEMENT METHOD

(75) Inventor: Takuya Kitamura, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 931 days.

(21) Appl. No.: 09/894,176

(22) Filed: Jun. 27, 2001

(65) Prior Publication Data

US 2002/0114337 A1 Aug. 22, 2002

(30) Foreign Application Priority Data

Feb. 19, 2001 (JP) .................................. 2001-041806

(51) Int. Cl.$^7$ ............................................ H04L 12/56
(52) U.S. Cl. .................................. 370/395.21; 370/401
(58) Field of Search ..................... 370/395.21, 395.41, 370/230.1, 468, 401

(56) References Cited

U.S. PATENT DOCUMENTS 5,463,620 A * 10/1995 Sriram ........................ 370/412
6,404,738 B1 * 6/2002 Reininger et al. ........... 370/236
6,765,873 B1 * 7/2004 Fichou et al. ............... 370/235

FOREIGN PATENT DOCUMENTS

JP 10-107802 4/1998

* cited by examiner

Primary Examiner—Kenneth Vanderpuye
(74) Attorney, Agent, or Firm—Katten Muchin Rosenman LLP

(57) ABSTRACT

The present invention relates to a communication device for transmitting transmission information to a connectionless network, while shaping it, within the range of a transmission bandwidth (=BWt·BWr/ΣBW) to be applied to transmission of this transmission information computed based on bandwidths BWt and BWr, which are allotted respectively to a local station corresponding to a transmitting party of the transmission information and a node corresponding to a destination, and the sum total ΣBW of bandwidths allotted to all the nodes except that destination, and a bandwidth management method applied to the communication device. In a network to which the present invention is applied, bandwidths are managed properly and efficiently, and furthermore, high transmission quality and service quality are maintained steadily and high RAS is also enhanced.

26 Claims, 10 Drawing Sheets

FIG. 3

| COMMUNICATION DEVICE IDENTIFIER | CONTRACTED BANDWIDTH(Mbps) |
|---|---|
| A | 3 $(= BW_A)$ |
| B | 1 $(= BW_B)$ |
| C | 2 $(= BW_C)$ |
| ⋮ | ⋮ |

| TRANSMITTING/RECEIVING END IDENTIFIER || COMPUTED BANDWIDTH (Mbps) |
|---|---|---|
| TRANSMITTING PARTY | DESTINATION | |
| A | B | 0.6 |
|   | C | 1.5 |
| B | A | 1.0 |
|   | C | 0.5 |
| C | A | 2.0 |
|   | B | 0.4 |
| ⋮ | ⋮ | ⋮ |

| SOURCE USER PORT NUMBER (16 BITS) | DESTINATION PORT NUMBER (16 BITS) |
|---|---|
| UDP DATA LENGTH (16 BITS) | UDP CHECK SUM (16 BITS) |
| LODGMENT ADDRESS (32 BITS) ||
| LODGMENT SUBNET MASK (32 BITS) ||
| TRANSMISSION RATE (32 BITS) ||
| ABOVE THREE ITEMS ARE REPEATEDLY APPENDED IN INDICATED MESSAGE ACCORDING TO NUMBER OF ITEMS IN TABLE. ||

F I G. 7

| TRANSMITTING/RECEIVING END IDENTIFIER | | COMPUTED BANDWIDTH (Mbps) |
|---|---|---|
| TRANSMITTING PARTY | DESTINATION | |
| A | B | 1.0 |
| | C | 2.0 |
| B | A | 1.0 |
| | C | 0.0 |
| C | A | 2.0 |
| | B | 0.0 |
| ⋮ | ⋮ | ⋮ |

| TIME ZONE P | UNCERTAINTY PARAMETER (UNCERTAINTY) AP |
|---|---|
| 0:00~ 7:59 | 5     (=A1) |
| 8:00~12:00 | 1.5   (=A2) |
| 13:00~17:00 | 1     (=A3) |
| 17:01~23:59 | 2     (=A4) |

39-A~39-C

F I G. 1 0

| TRANSMITTING/RECEIVING END IDENTIFIER || COMPUTED BANDWIDTH (Mbps) |
|---|---|---|
| TRANSMITTING PARTY | DESTINATION | |
| A | B | 0.9 |
|   | C | 2.25 |
| B | A | 1.5 |
|   | C | 0.9 |
| C | A | 3.0 |
|   | B | 0.6 |
| ⋮ | ⋮ | ⋮ |

38-A∼38-C

COMMUNICATION DEVICE AND BANDWIDTH MANAGEMENT METHOD

BACKGROUND OF THE INVENTION

1. Field of the Invention

The present invention relates to a communication device disposed in a connectionless network as a node and a bandwidth management method for setting a bandwidth to be applied to transmission in the communication device.

2. Description of the Related Art

In recent years, many private networks laid among lodgments of business organizations via public networks and leased lines for realizing transmission of various information related to the organizations' business employ technology of packet switching and frame relay (cell relay) and so on so that they are configured as connectionless networks allowing communication channels to be formed among desired lodgments.

Furthermore, at present, telecommunication carriers have been switching to connectionless networks to which IP (Internet Protocol), Eathernet, and so on having high line utilization efficiency and providing the maximum merits of multiplexing are applied, and as a result, business organizations as their users have also been configuring their networks utilizing more economical services such as low-charged IP-VPN (L3VPN) and L2VPN.

In such a connectionless network, bandwidths to be allotted for transmitting transmission information among individual lodgments are released when there is no transmission information. Therefore, when a large volume of packets are transmitted in parallel to a specific lodgment from a plurality of lodgments, for example, an edge network connected to this connectionless network gets into congestion and many of the packets are likely to be discarded.

Generally, these discarded packets can be restored by a retransmission procedure included in TCP (Transmission Control Protocol), which is an upper ranked transmission protocol of IP.

However, none of the discarded packets, which are transmitted by a communication device terminating a network by a layer above an IP layer or to be received by such a communication device (for example, communication signals and speech signals transmitted/received under UDP (User Datagram Protocol) fall under this category), are restored.

Conventionally, as a prior art for solving the above problem in such a connectionless network, there exists an ATM cell rate/bandwidth controlling system as described, for example, in Japanese Patent Laid-open No. Hei 10-107802, wherein shaping of each transmission information according to bandwidths physically allotted to individual communication devices and a contracted bandwidth of a communication device corresponding to a destination of the transmission information to be transmitted makes it possible to configure almost the same network as a conventional private network in which logical lines are formed between individual destinations and a leased line is utilized.

In the above-described conventional example, bandwidths of paths to be formed among all the lodgments and bandwidths which individual lodgments can allot to transmission according to the combinations of these bandwidths are set manually when necessary.

However, for example, when a bandwidth allotted to a specific lodgment is changed, or when some lodgment is expanded or relocated, previously set bandwidths and so on have to be updated synchronously in all the lodgments.

Moreover, such updating operations cannot be started until the operations of communication devices installed in individual lodgments are forcibly interrupted or until the state and the time permitting the interruption of their operations are recognized.

However, as for networks used, for example, by banks and securities companies and provided for their basic business, the degeneration of transmission quality or the decline in reliability due to the operation interruption of their communication devices at the time of updating bandwidths and so on as described above as well as the aforesaid discarding of packets is not permitted.

Therefore, transmission carriers providing services such as L3VPN and L2VPN (including 'system integration enterprises' providing L3VPN and L2VPN services and a device for realizing these services as a system) have strongly demanded that a connectionless network having flexible adaptability to maintenance and operation states and an efficient transmission ability of various transmission information including speech signals be realized.

SUMMARY OF THE INVENTION

An object of the present invention is to provide a communication device and a bandwidth management method which can automatically set and maintain a transmission bandwidth to be applied to transmission at a value conforming to bandwidths allotted to all the communication devices disposed in a common network.

Another object of the present invention is to manage bandwidths properly and efficiently, steadily maintain high transmission quality and service quality and in addition, also enhance reliability over the whole bandwidth management method.

Still another object of the present invention is to allot a bandwidth allotted to a node corresponding to a transmitting party in such a proportion in which a surplus bandwidth to be applied information transmitted by this node in parallel to 'nodes other than a destination node' can be secured and applied to transmission of desired transmission information.

Yet another object of the present invention is to effectively utilize a surplus bandwidth allotted to a transmitting party for efficiently transmitting desired transmission information.

Furthermore, another object of the present invention is to accurately and efficiently compute a transmission bandwidth to be applied to transmission regardless of which node becomes a destination.

Moreover, another object of the present invention is to reduce load or simplify the structure thereof, and to flexibly adapt to its maintenance and operation states.

Furthermore, another object of the present invention is to set a bandwidth applied at the time of transmission at a value flexibly adapting to various states of a network.

Moreover, another object of the present invention is to apply, in a balanced manner, a surplus bandwidth allotted to a transmitting party to all the transmission information transmitted in parallel by the transmitting party.

Furthermore, another object of the present invention is to effectively apply a surplus bandwidth allotted to a transmitting party to all transmission information to be transmitted in parallel by the transmitting party so that the application is not done in a distinctively unbalanced manner.

Moreover, another object of the present invention is to maintain high RAS (reliability, availability and serviceability) and high service quality and is also to flexibly adapt to various states of maintenance and operation.

Furthermore, another object of the present invention is to flexibly adapt to various network situations and demands related to maintenance and operation.

Moreover, another object of the present invention is to simplify means of communication and reduce load on the network.

Furthermore, another object of the present invention is to avoid the setting of a transmission bandwidth transitionally at an inappropriate value, even when updating of the bandwidth allotted to any of the node equipment is delayed because of all bandwidths allotted to individual node equipment not being given to the other node equipment at the same time.

Moreover, another object of the present invention is to ease restrictions related to the structure of each section.

The objects described above are achieved by a communication device, comprising sections for storing bandwidths individually allotted to nodes which can be a transmitting party and a destination, wherein bandwidths $BWt$ and $BWr$, which are allotted to respective nodes corresponding to an actual transmitting party and destination, and the sum total $\Sigma BW$ of bandwidths allotted to all the nodes other than the destination are obtained, and a transmission bandwidth $(=BW \cdot BWr/\Sigma BW)$ to be restricted in the process of shaping at the time of transmission is obtained based on these bandwidths and the sum total.

In such a communication device, the above transmission bandwidth is set at a larger value as the bandwidth $BWt$ allotted to the node to be the transmitting party (a communication device according to the present invention) of transmission information is larger and a proportion between the bandwidth $BWr$ allotted to the node to be the destination of the transmission information and the sum total $\Sigma BW$ of the bandwidths allotted to the nodes other than this node is larger.

The objects of the present invention described above are also achieved by a communication device, wherein uncertainty $U$ is given in advance, uncertainty $U$ being a value for a monotone nondecreasing function of a proportion between a pre-allotted bandwidth and a bandwidth included in this bandwidth allotted to the local station and used in transmitting any transmission information, and a transmission bandwidth $(=U \cdot BWt \cdot BWr/\Sigma BW)$ is obtained by applying the uncertainty $U$.

In such a communication device, the uncertainty $U$ applied in computing the above-mentioned transmission bandwidth is set at a larger value as the surplus bandwidth allotted to a node corresponding to a transmitting party (a communication device according to the present invention) is larger, and comes to be a value appropriate for the distribution of traffic.

The objects described above are also achieved by a communication device, wherein a bandwidth pre-allotted to a local station is notified to other nodes, and together with this bandwidth, bandwidths individually notified by these other nodes are stored in the aforesaid sections.

In such a communication device, the above sections store all the bandwidths mutually exchanged among a plurality of nodes and allotted individually to these nodes.

The objects described above are also achieved by a communication device, wherein a bandwidth downloaded by a device corresponding to any one of the nodes or none of the nodes is stored in the above sections.

In such a communication device, the above-mentioned device is a device (or devices) either corresponding to one (or a plurality) of the plural nodes or corresponding to none of them.

The objects described above are also achieved by a communication device, wherein bandwidths stored in any storage medium are stored in the above sections.

In such a communication device, bandwidths pre-allotted individually to a plurality of nodes are stored in the above sections even when the bandwidths are not mutually exchanged among these nodes.

The objects described above are also achieved by a communication device, wherein bandwidths set under man-machine interface are stored in the above sections.

In such a communication device, a bandwidth to be allotted to any of the plural nodes is also set or updated in the process of maintenance and operation when necessary.

The objects described above are also achieved by a communication device, wherein uncertainty $U$ is updated according to an event occurring in a network or according to the distribution of traffic in the network.

In such a communication device, the certainty $U$ is maintained at a value conforming to a surplus bandwidth, which is included in a bandwidth allotted to a node corresponding to a transmitting party and is increasing/decreasing according to the above event and the distribution of traffic.

The objects described above are also achieved by a communication device, wherein uncertainty $U$ is updated at a predetermined frequency or cycle.

In such a communication device, the uncertainty $U$ is updated irrespective of an event occurring to a network and the distribution of traffic in the network.

The objects described above are also achieved by a communication device, wherein uncertainty $U$ is set at a value weighted larger as the sum total of bandwidths $BWr$, $BWt$ allotted respectively to a destination and a transmitting party is larger.

In such a communication device, a larger amount of surplus bandwidth allotted to a transmitting party of transmission information is allotted with higher priority given as the bandwidths allotted to both or one of the transmitting party and the destination of the transmission information is larger, and it is applied to transmission of the transmission information.

The objects described above are also achieved by a communication device, wherein uncertainty $U$ is set at a value weighted conforming to the attribute of a flow of a packet including transmission information to be transmitted.

In such a communication device, a surplus bandwidth allotted to a transmitting party is allotted in a ratio flexibly adapting to a service class or other demands of individual information to be transmitted in parallel by the transmitting party.

The objects described above are also achieved by a communication device, wherein every time a bandwidth allotted to a local station is updated, this bandwidth is notified to other nodes.

In such a communication device, a bandwidth to be applied for some node equipment to transmit desired transmission information to a communication device according to the present invention is adjusted according to the increase/decrease in a bandwidth allotted to the communication device when necessary.

The objects described above are also achieved by a communication device, wherein a bandwidth allotted to a local station is notified to other nodes via a transmission path or a path different from its network.

In such a communication device, bandwidths allotted to individual nodes are exchanged mutually among these nodes without passing the network originally provided for a transmission service of transmission information.

The objects described above are also achieved by a communication device comprising a clocking section, wherein a transmission bandwidth is obtained based on the combination of updated bandwidths by a bandwidth computing section at or after the predetermined time given by the clocking section.

In such a communication device, when the same sections as the clocking section and the bandwidth computing section as mentioned above are provided individually in all the nodes, the transmission bandwidth is more accurately computed and updated synchronously based on the combination of the updated bandwidths stored in a storage section as the times given by the individual clocking sections provided in these nodes are more accurate.

The objects described above are also achieved by a communication device comprising individual storage areas for individually storing the combination of updated bandwidths applied in computing a transmission bandwidth and a succeeding combination after undergoing some alteration to that combination.

In such a communication device, the plural storage areas included in a storage section as described above are managed based on a first-in first-out system.

The objects described above are also achieved by a bandwidth management method for realizing the aforesaid communication device.

In such a bandwidth management method, a transmission bandwidth is set at a larger value as a bandwidth BWt allotted to a node corresponding a transmitting party of transmission information is larger and a proportion between a bandwidth BWr allotted to a node to be a destination of the transmission information and the sum total $\Sigma BW$ of the bandwidths allotted to all the nodes other than the above node is larger.

Furthermore, the aforesaid uncertainty U is larger as a surplus bandwidth allotted to the node corresponding to the transmitting party is larger, and is at a value appropriate for the distribution of traffic.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 3 is a table showing the structure of a contracted bandwidth table;

FIG. 4 is a table showing the structure of a computed bandwidth table;

FIG. 6 is a table showing a format of a packet indicating a download request;

FIG. 7 is a table showing other computed bandwidths computed in the first embodiment of the present invention;

FIG. 9 is a table showing the structure of a supplement table; and

FIG. 10 is a table showing computed bandwidths computed in the second embodiment of the present invention.

DESCRIPTION OF THE PREFERRED EMBODIMENTS

Figure 1:
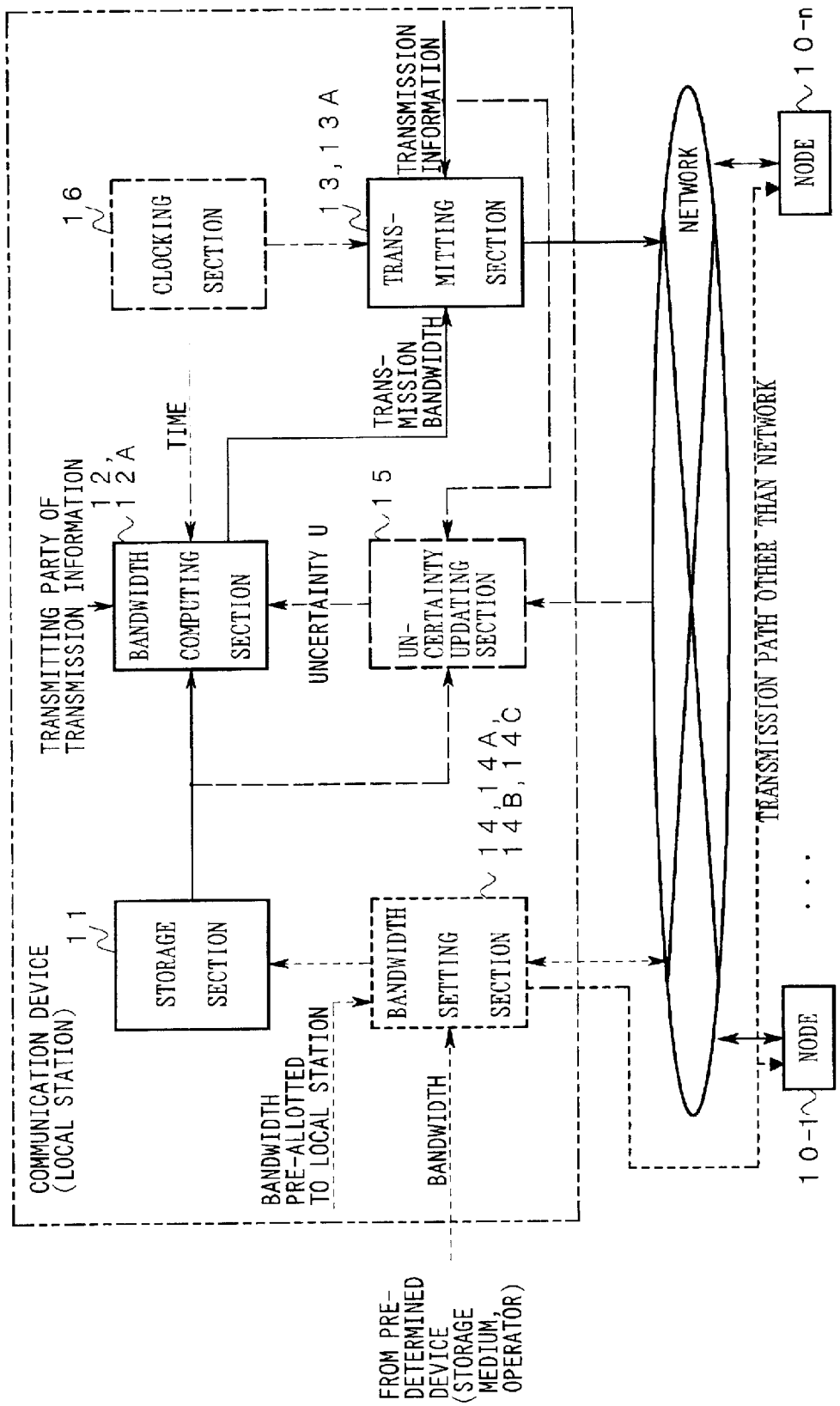
FIG. 1 is a block diagram showing a principle of the present invention.

The principles of a communication device according to the present invention will be first explained referring to FIG. 1.

FIG. 1 is a block diagram of a principle of the present invention.

The communication device shown in FIG. 1 comprises a storage section 11, bandwidth computing sections 12 and 12A, transmitting sections 13 and 13A, bandwidth setting sections 14, 14A, 14B, and 14C, an uncertainty updating section 15, and a clocking section 16.

A first principle of the communication device according to the present invention is described as follows.

In the storage section 11, all bandwidths allotted individually to a plurality of nodes 10-1 to 10-n including a local station, accommodated in a connectionless network, are stored. The bandwidth computing section 12 obtains from the storage section 11 bandwidths BWt and BWr, which are allotted respectively to the local station corresponding to a transmitting party of transmission information and a destination out of these nodes 10-1 to 10-n, and the sum total $\Sigma BW$ of the bandwidths allotted to all the nodes except the destination, and based on these bandwidths BWt and BWr and the sum total $\Sigma BW$, it computes transmission bandwidth $(=BWt \cdot BWr/\Sigma BW)$ to be applied to transmission of the transmission information. The transmitting section 13 shapes the above transmission information to transmit the transmission information to the connectionless network within the range of the transmission bandwidth computed by the bandwidth computing section 12.

This transmission bandwidth is set at a larger value as the bandwidth BWt allotted to a node corresponding to the transmitting party of the above transmission information (a communication device according to the present invention) is larger and a proportion between the bandwidth BWr allotted to a node to be the destination of the transmission information and the sum total $\Sigma BW$ of the bandwidths allotted to all the nodes except that node is larger.

Therefore, the bandwidth BWt allotted to the node corresponding to the transmitting party is allotted in such a proportion to secure a surplus bandwidth to be applied to some information transmitted by this node in parallel to the nodes other than the aforesaid node to be the destination, and is also applied for transmitting the aforesaid transmission information.

A second principle of the communication device according to the present invention is described as follows.

In the storage section 11, all bandwidths allotted individually to a plurality of nodes 10-1 to 10-n including a local station, accommodated in a connectionless network, are stored. To the bandwidth computing section 12A, uncertainty U, which is a value for a monotone nondecreasing function of a proportion between a bandwidth allotted to the local station and a bandwidth included in this bandwidth and allotted to transmission of some transmission information, is given in advance. Furthermore, the bandwidth computing section 12A obtains from the storage section 11 bandwidths BWt and BWr, out of the plural nodes 10-1 to 10-n mentioned above, which are allotted respectively to the local station corresponding to a transmitting party of this transmission information and a destination, and the sum total ΣBW of the bandwidths allotted to all the nodes except the destination, and computes a transmission bandwidth (=U·BWt·BWr/ΣBW) to be applied to transmission of the transmission information. The transmitting section 13A shapes this transmission information to transmit the transmission information to the connectionless network within the range of the transmission bandwidth computed by the bandwidth computing section 12A.

The uncertainty U applied in computing the transmission bandwidth as described above is set at a larger value as a surplus bandwidth allotted to a node corresponding to the transmitting party (a communication device according to the present invention) is larger, and is at a value corresponding to the distribution of traffic.

Therefore, this surplus bandwidth is effectively utilized for efficient transmission of the above transmission information.

A third principle of the communication device according to the present invention is described as follows.

The bandwidth setting section 14 notifies of a bandwidth pre-allotted to a local station to nodes other than a local station out of a plurality of nodes 10-1 to 10-n, and together with this bandwidth, stores bandwidths individually notified by these other nodes in the storage section 11.

Thereby, the storage section 11 stores all the bandwidths mutually exchanged among a plurality of nodes 10-1 to 10-n and allotted individually to these nodes 10-1 to 10-n.

Therefore, regardless of which node out of the node equipment 10-1 to 10-n corresponds to a node to be a destination of information to be transmitted, a transmission bandwidth to be applied to transmission of the information is accurately and efficiently computed.

A fourth principle of the communication device according to the present invention is described as follows.

The bandwidth setting section 14A receives bandwidths pre-allotted individually to a plurality of nodes 10-1 to 10-n and downloaded by a predetermined device, and stores these bandwidths in the storage section 11.

The above-mentioned device is a device (are devices) corresponding to one of (or a plurality of) the plural nodes 10-1 to 10-n, or corresponding to none of these nodes 10-1 to 10-n.

Therefore, reduction of load and simplification of structure of the nodes 10-1 to 10-n are realized, and flexible adaptability to its maintenance and operation states can be realized.

A fifth principle of the communication device according to the present invention is described as follows.

The bandwidth setting section 14B stores in the storage section 11 bandwidths pre-allotted individually to a plurality of nodes 10-1 to 10-n and stored in a predetermined storage medium.

Thereby, the bandwidths pre-allotted individually to the plural nodes 10-1 to 10-n are stored in the storage section 11 even when they are not mutually exchanged among these nodes 10-1 to 10-n.

Therefore, reduction of load and simplification of structure of the nodes 10-1 to 10-n are realized.

A sixth principle of the communication device according to the present invention is described as follows.

The bandwidth setting section 14C adopts man-machine interface related to the setting of bandwidths to be allotted individually to all or a part of a plurality of nodes 10-1 to 10-n, and stores in the storage section 11 the bandwidths set under the man-machine interface.

Thereby, the bandwidth to be allotted to any of the plural nodes 10-1 to 10-n are also set or updated in the process of maintenance and operation when necessary.

Therefore, flexible adaptability to its maintenance and operation states can be secured.

A seventh principle of the communication device according to the present invention is described as follows.

The uncertainty updating section 15 updates uncertainty U according to an event occurring in a connectionless network or the distribution of traffic in the network. The bandwidth computing section 12A computes a transmission bandwidth by applying the uncertainty U thus updated.

Thereby, the uncertainty U is maintained at a value conforming to a surplus bandwidth, which is included in a bandwidth allotted to a node corresponding to a transmitting party and is increasing/decreasing according to the event and the distribution of traffic mentioned above.

Therefore, in the communication device according to the present invention, a bandwidth to be applied to transmission of individual information is set at a value adapting flexibly to various states of the network.

An eighth principle of the communication device according to the present invention is describes as follows.

The uncertainty updating section 15 updates uncertainty U at a predetermined frequency or cycle.

Thereby, the uncertainty U is updated irrespective of an event occurring to a network and the distribution of traffic in the network.

Therefore, a surplus bandwidth allotted to a node corresponding to a transmitting party is applied in a balanced manner to all of the transmission information transmitted in parallel by this node.

A ninth principle of the communication device according to the present invention is described as follows.

The uncertainty updating section 15 obtains from the storage section 11 bandwidths BWr, BWt, which are allotted respectively to a node to be a destination of transmission information and a local station out of nodes 10-1 to 10-n, and sets uncertainty U at a value weighted larger as the sum total of the bandwidths BWr and BWt is larger.

Thereby, a larger amount of surplus bandwidth allotted to a transmitting party of the above transmission information is allotted with higher priority given as bandwidths allotted to both or one of the transmitting party and the destination of the transmission information are larger, and the bandwidth is applied for transmitting this transmission information.

Therefore, this surplus bandwidth is effectively applied, not in a distinctively unbalanced manner, for any of the transmission information to be transmitted in parallel by the above transmitting party.

A tenth principle of the communication device according to the present invention is described as follows.

The uncertainty updating section 15 sets uncertainty U at a value weighted conforming to the attribute of a flow of a packet including information to be transmitted.

Thereby, a surplus bandwidth allotted to a transmitting party is distributed in a ratio flexibly adapting to a service class and other demands of individual transmission information to be transmitted in parallel by the transmitting party.

Therefore, high RAS and high service quality are maintained and flexible adaptability to various states of maintenance and operation can be realized.

An eleventh principle of the communication device according to the present invention is described as follows.

Every time a bandwidth allotted to a local station is updated, the bandwidth setting section 14 notifies this bandwidth to nodes other than the local station.

Thereby, a bandwidth to be applied for any of the node equipment 10-1 to 10-n is adjusted according to the increase/decrease in a bandwidth allotted to the communication device when necessary, node equipment 10-1 to 10-n being equipment for transmitting desired transmission information to the communication device according to the present invention.

Therefore, flexible adaptability to a network situation and a demand related to maintenance and operation can be realized.

A twelfth principle of the communication device according to the present invention is described as follows.

Between nodes other than a local station out of a plurality of nodes 10-1 to 10-n and the bandwidth setting section 14, a transmission path or a path different from a connectionless network is formed. The bandwidth setting section 14 notifies to the other nodes a bandwidth allotted to the local station via this transmission path or path.

Thereby, bandwidths individually allotted to the nodes 10-1 to 10-n are exchanged mutually among these nodes 10-1 to 10-n without passing through the network originally provided for a transmission service of transmission information.

Therefore, a communication protocol to be applied is simplified and load of the above network is reduced.

A thirteenth principle of the communication device according to the present invention is described as follows.

The clocking section 16 works as a timer, or clocks, and gives the time. The bandwidth computing sections 12 and 12A apply a combination of updated bandwidths stored in the storage section 11 in computing a transmission bandwidth at or after the predetermined time given by the clocking section 16.

Thereby, when the same parts as the above mentioned clocking section 16 and the bandwidth computing sections 12 and 12A are provided individually in all the nodes 10-1 to 10-n, the transmission bandwidths are more accurately computed and updated synchronously based on the combination of the updated bandwidths stored in the storage section 11 as the times given by the individual clocking sections 16 provided in all these nodes 10-1 to 10-n are more accurate.

Therefore, all the individually allotted bandwidths are not mutually exchanged synchronously among the node equipment 10-1 to 10-n, which prevents the transmission bandwidths from being set transitionally at inappropriate values even when updating of a bandwidth allotted to any of the node equipment 10-1 to 10-n is delayed.

A fourteenth principle of the communication device according to the present invention is described as follows.

The storage section 11 has storage areas for individually storing a combination of updated bandwidths applied in computing a transmission bandwidth by the bandwidth computing sections 12 and 12A and a succeeding combination after undergoing some alterations to that combination. The bandwidth computing sections 12 and 12A apply the above succeeding combination in computing the transmission bandwidth.

Thereby, the plural storage areas included in the storage section 11 as described above are managed based on a first-in first-out system.

Therefore, even when bandwidths individually allotted to nodes 10-1 to 10-n are updated asynchronously with the instant when the above transmission width is computed, the combination of the bandwidths to be applied in computing this transmission bandwidth can be steadily and surely obtained.

A first principle of a bandwidth management method according to the present invention is described as follows.

Out of a plurality of nodes 10-1 to 10-n accommodated in a connectionless network, bandwidths BWt and BWr, which are allotted respectively to nodes to be a transmitting party and a destination of transmission information, and the sum total $\Sigma BW$ of bandwidths allotted to all the nodes except the destination are obtained. Then, based on these bandwidths BWt and BWr and the sum total $\Sigma BW$, a transmission bandwidth ($=BWt \cdot BWr/\Sigma BW$) to be applied to transmission of this transmission information is computed. This transmission information is shaped and transmitted to the above connectionless network within the range of the computed transmission bandwidth.

This transmission bandwidth is set at a larger value as the bandwidth BWt is larger, and a proportion between the bandwidth BWr and the sum total $\Sigma BW$ of the bandwidths is larger. In this case, the bandwidth BWt is allotted to the node corresponding to the above transmitting party of the transmission information, the bandwidth BWr is allotted to the node to be the destination of this transmission information, and the sum total $\Sigma BW$ of the bandwidths are allotted to all the nodes other than this node.

Therefore, the bandwidth BWt allotted to the node corresponding to the transmitting party is allotted in such a proportion to secure a surplus bandwidth to be applied for this node to transmit any information in parallel to the nodes other than the aforesaid node to be the destination, and it is also applied to transmission of the information mentioned above.

A second principle of the bandwidth management method according to the present invention is described as follows.

Bandwidths BWt and BWr and the sum total $\Sigma BW$ of bandwidths allotted to all the nodes except the destination are obtained, the bandwidths BWt and BWr being allotted respectively to nodes to be a transmitting party and a destination of transmission information out of a plurality of nodes 10-1 to 10-n accommodated in a connectionless network. Then, based on uncertainty U, which is a value for a monotone nondecreasing function of a proportion between the bandwidth BWt allotted to this transmitting party and a bandwidth included in this bandwidth and allotted for transmission of some transmission information, the bandwidths BWt and BWr, and the sum total $\Sigma BW$ of the bandwidths described above, a transmission bandwidth ($=U \cdot BWt \cdot BWr/\Sigma BW$) to be applied to transmission of this transmission information is computed. Then this transmission information is shaped and transmitted to the above-mentioned connectionless network within the range of the transmission bandwidth thus computed.

The above-mentioned uncertainty U comes to have a larger value as a surplus bandwidth allotted to the node corresponding to the transmitting party is larger, and is at a value corresponding to the distribution of traffic.

Therefore, this surplus bandwidth is effectively utilized for efficient transmission of the above transmission information.

Embodiments of the present invention are explained in detail below referring to the drawings.

Figure 2:
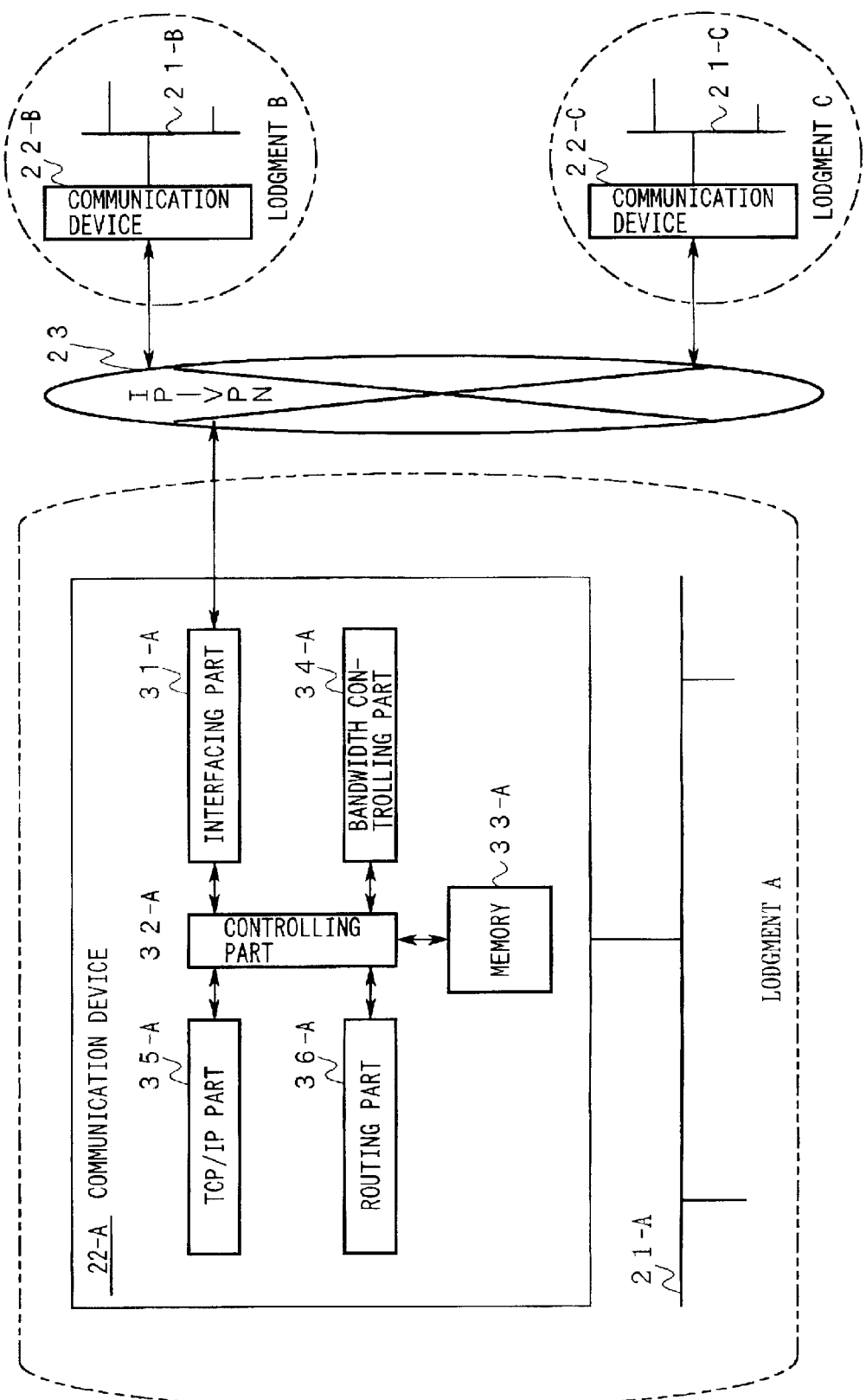
FIG. 2 is a diagram showing a first to a fourth embodiment of the present invention.

FIG. 2 is a diagram showing a first to a fourth embodiment according to the present invention.

In the drawing, LAN21-A, 21-B, and 21-C are formed under the control of communication devices 22-A, 22-B, and 22-C installed in lodgments A, B, and C respectively, and these communication devices 22-A to 22-C are connected to IP-VPN23.

The communication device 22-A is composed of the following elements:

an interfacing part 31-A connected via a physical link (or a leased line) in a CSMA/CD system to a corresponding edge network of IP-VPN23;

a controlling part 32-A having a port directly connected to an input/output terminal of the interfacing part 31-A;

a memory 33-A to be directly accessed by the controlling part 32-A; and a bandwidth controlling part 34-A, a TCP/IP part 35-A, and a routing part 36-A connected to corresponding ports of the controlling part 32-A.

In the communication device 22-A, a contracted bandwidth table 37-A, which is shown in FIG. 3, for storing the following information therein is provided in a storage area of the memory 33-A:

'communication device identifiers' (=A, B, and C) individually indicating the communication devices 22-A to 22C; and contracted bandwidths (supposed to be shown by a common unit 'megabits/sec' to simplify the explanation here), which are bandwidths allotted individually to these communication devices 22-A to 22-C and to be allotted for transmission.

Furthermore, in the storage area of the memory 33-A, a computed bandwidth table 38-A, which is shown in FIG. 4, for storing the following information is disposed:

'transmitting/receiving end identifiers' corresponding to all the combinations of communication devices, out of the communication devices 22-A to 22-C, to possibly be a transmitting party and a destination of some packet, and indicating pairs of communication devices (lodgments) corresponding to these transmitting parties and destinations (supposed to be given as a pair of identifiers for a corresponding transmitting party and destination out of the identifiers 'A' to 'C' indicating the lodgments A to C to simplify the explanation here); and 'computed bandwidths' (supposed to be shown as a common unit 'megabits/sec' to simplify the explanation here) showing bandwidths to be applied to transmission of transmission information from the transmitting parties to the destinations indicated by these 'transmitting/receiving end identifiers'.

Incidentally, since the structures of the communication devices 22-B and 22-C are basically the same as that of the communication device 22-A, the explanation thereof is omitted below, designating them by adding characters 'B' and 'C' to the corresponding elements in place of the character 'A'.

It is also supposed below that as for values for the 'communication device identifier' fields and the 'contracted bandwidth' fields of the records corresponding to the respective communication devices 22-A to 22-C out of the records in the contracted bandwidth tables 37-A to 37-C individually disposed in the storage areas of the memories 33-A to 33-C, constants included in office data are stored in advance.

Figure 5:
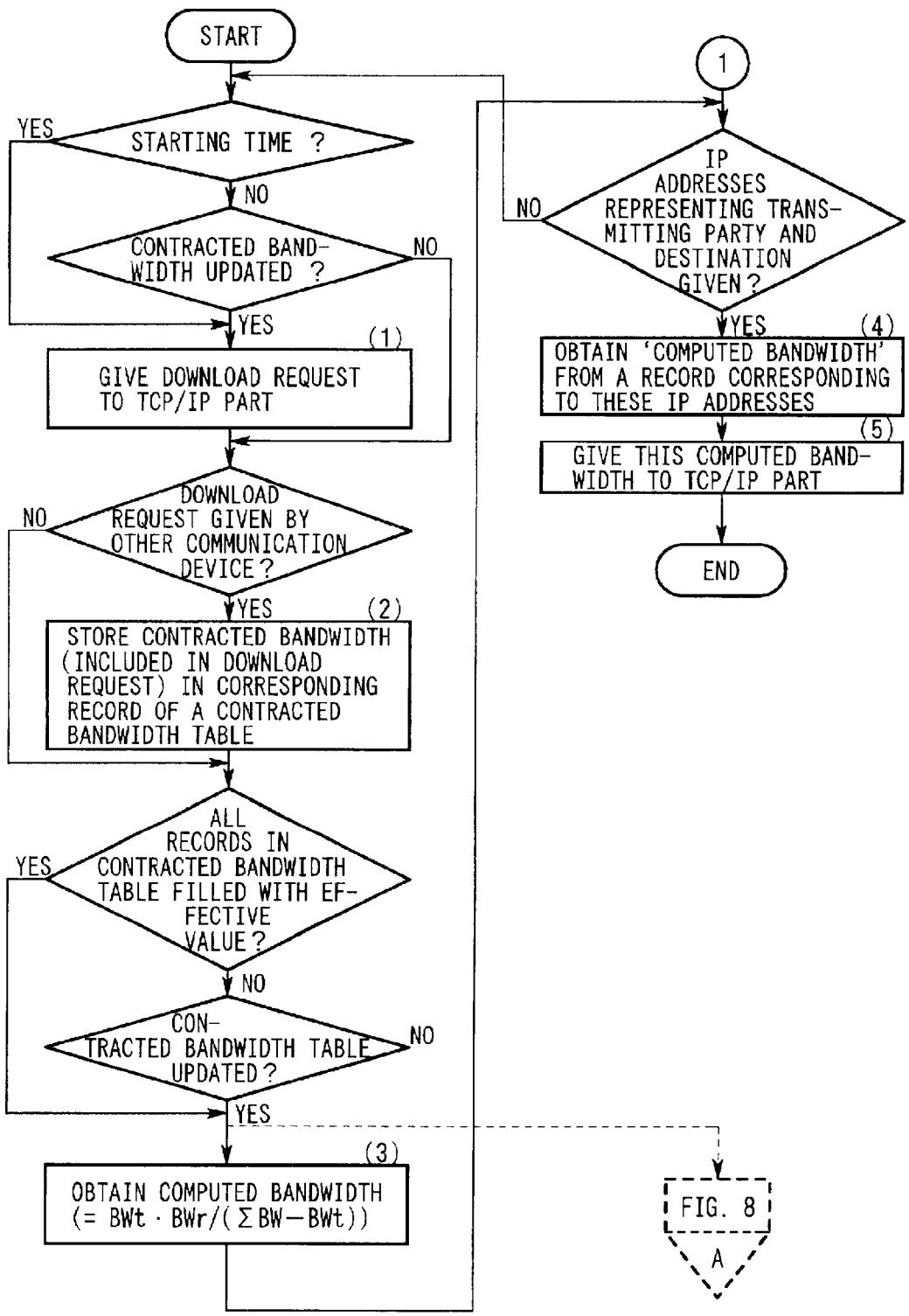
FIG. 5 is a flow chart showing an operation according to the first embodiment of the present invention.

FIG. 5 is an operational flow chart of the first embodiment according to the present invention.

Operations of the first embodiment according to the present invention are explained below referring to FIG. 2 to FIG. 5.

Firstly, character 'Z' indicating that it corresponds to all the aforesaid characters 'A' to 'C' is added to each of the numerals and signs hereinafter in order to explain what are common to all the communication devices 22-A to 22-C.

In a communication device 22-Z, at its starting time and when a contracted bandwidth of this communication device 22-Z is updated, a bandwidth controlling part 34-Z gives to a TCP/IP part 35-Z a download request including the following information via a controlling part 32-Z (FIG. 5(1)):

contracted bandwidths stored in advance as the aforesaid office data out of the values for the records in a contracted bandwidth table 37-Z; and control information indicating that the above information should be downloaded to all the communication devices 22-A to 22-C except a local station (hereinafter simply called 'other communication devices').

The TCP/IP part 35-Z generates a packet in a format conforming to UDP as shown in FIG. 6, indicating the above 'download request' as an announce message. Furthermore, the TCP/IP part 35-Z works in cooperation with the controlling part 32-Z and an interfacing part 31-Z to download this packet to the other communication devices mentioned above via IPVPN23.

Note that, hereinafter, a character 'z' in a small letter, which makes it possible to distinct it from the aforesaid character 'Z' in a capital letter, indicating that it corresponds to all the characters 'A' to 'C' is added to respective numerals and signs in order to explain the operations of each part of the other communication devices corresponding to destinations of this packet.

In a communication device 22-z, an interfacing part 31-z, a controlling part 32-z, a TCP/IP part 35-z and a bandwidth controlling part 34-z perform a processing which is based on a reverse procedure of the processing procedure performed in cooperation as described above in the communication device 22-Z corresponding to the transmitting party of this packet, so that the 'contracted bandwidths' (given as a pair of corresponding 'communication device identifiers') included in this 'packet' are stored in the corresponding records in a contracted bandwidth table 37-z.

Therefore, in the contracted bandwidth table 37-z and 37-Z provided in the communication devices 22-z and 22-Z, as shown in FIG. 3, the contracted bandwidths of all the communication devices 22-A to 22-C are stored to correspond to the communication device identifiers 'A' to 'C' respectively indicating these communication devices 22-A to 22-C.

When the bandwidth controlling part 34-z recognizes that effective values are stored in all the records in the contracted bandwidth table 37-z or some records are updated, it performs an arithmetic operation shown by the following equation to obtain computed bandwidths BWg corresponding individually to all combinations of the communication devices to be stored in the 'transmitting/receiving end identifier' fields of a computed bandwidth table 38-z (FIG. 5 (3)).

$$BWg = BWt \cdot BWr / (\Sigma BW - BWt) \qquad (1)$$

Here, BWt is a contracted bandwidth of a communication device 22-t corresponding to a transmitting party (either one of the communication devices 22-A to 22-C), BWr is a contracted bandwidth of a communication device 22-r corresponding to a destination (either one of the communication devices 22-A to 22-C), and $\Sigma BW$ is the sum total of bandwidths of the communication devices 22-A to 22-C, and all of these contracted bandwidths are given as the previously stored values in the contracted bandwidth table 37-z shown in FIG. 3.

Furthermore, in the communication device 22-A, for example, when the TCP/IP part 35-A recognizes some transmission information to be transmitted to the other communication devices (supposed to be the communication device 22-B to simplify the explanation here) under the control of the controlling part 32-A at the time all the effective values for all the records in the computed bandwidth table 38-A are thus stored, it gives IP addresses representing a transmitting party and a destination of this transmission information to the routing part 36-A and the bandwidth controlling part 34-A via its controlling part 32-A.

Based on these IP addresses, the routing part 36-A determines a route (including a corresponding interfacing part in case a plurality of routes can work as such a route and the interfacing parts individually corresponding to these routes are provided) for transmitting the above transmission information and gives the route to the TCP/IP part 35-A via the controlling part 32-A.

The bandwidth controlling part 34-A accesses to the memory 33-A via the controlling part 32-A, thereby obtains a value for a 'computed bandwidth' field (hereinafter simply called 'computed bandwidth') of a record, out of the records in the computed bandwidth table 38-A, in which values for 'transmitting/receiving end identifiers' correspond to a pair of these IP addresses (FIG. 5 (4)), and gives this computed bandwidth to the TCP/IP part 35-A via the controlling part 32-A (FIG. 5 (5)).

The TCP/IP part 35-A then gives the route and the computed bandwidth together with the aforesaid transmission information to the interfacing part 31-A via the controlling part 32-A.

The interfacing part 31-A accumulates and shapes corresponding transmission information respectively for each route to maintain information content of the transmission information to be transmitted per unit time to the corresponding route as an array of packets at or under the above computed bandwidth.

Thereby, in any of the communication devices 22-A to 22-C, even when a contracted bandwidth of any of these communication devices 22-A to 22-C is updated, a bandwidth to be applied to transmission of a packet is automatically set and maintained at a value proportional both to 'a contracted bandwidth of a communication device corresponding to a destination of the packet' and a ratio of a 'contracted bandwidth of a communication device corresponding to a transmitting party' to the 'sum total of contracted bandwidths of all the communication devices except this destination'.

Therefore, the contracted bandwidth of the communication device corresponding to the transmitting party is allotted in such a proportion to secure a surplus bandwidth applied to some information transmitted in parallel by this communication device to the communication devices other than the communication device corresponding to the aforesaid destination, and is also applied for transmitting the transmission information mentioned above.

Compared to a conventional example in which bandwidths of individual communication devices allotted to transmission have to be updated almost synchronously and manually for all of these communication devices according to expansion, relocation and others of a lodgment, maintenance and operation cost is reduced more and transmission quality and service quality are maintained more steadily.

Incidentally, in this embodiment, the aforesaid 'download request' is downloaded to the individual communication devices as a packet in the format as shown in FIG. 6.

However, such a 'download request' may be formed as information in any format and content as long as it is an operand realizing a process equivalent to the aforesaid process.

Furthermore, in this embodiment, any of the communication devices receiving the aforesaid 'download request' does not transmit any response, and the communication device corresponding to a transmitting party of this 'download request' does not repeat the transmission of this 'download request' at all.

However, the present invention is not limited to this constitution, and the transmitting party and the destination of the above 'download request' may be related to each other in such a manner, for example, where a reply message including a destination port number different from a destination port number included in the aforesaid announce message is transmitted to the communication device corresponding to the transmitting party of this 'download request'.

Furthermore, in this embodiment, a packet indicating a 'download request' is generated and downloaded based on a processing procedure which is led by the TCP/IP part 35-Z for realizing TCP (or IP).

However, the present invention is not limited to this constitution, and a similar packet may be generated and downloaded based on, for example, a processing procedure of an application system for realizing a process realizing an upper communication protocol of TCP (or IP) or the present invention.

Moreover, functional distribution and load distribution may be realized in any manner, in which such a process may be performed independently by the controlling part 32-Z or another component, or in cooperation among a plurality of components.

Furthermore, in this embodiment, the communication devices 22-A to 22-C download 'download requests' individually to all the other communication devices.

However, the present invention is not limited to this constitution, and the constitutions listed as follows, for example, may be applied to centralize processes related to control of traffic.

Bandwidths of all the communication devices 22-A to 22-C are registered as known information such as office data in a specific communication device out of the communication devices 22-A to 22-C or a device other than these communication devices 22-A to 22-C (for example, a server and so on connected to IP-VPN23).

This specific communication device, the server, or others has a computed bandwidth table whose constitution is the same as the computed bandwidth tables 38-A to 38-C as shown in FIG. 4, and computes values for the 'transmitting/receiving end identifier' fields and the 'computed bandwidth' fields of the respective records in this computed bandwidth table based on the aforesaid contracted bandwidths, even if no 'download request' is given.

This specific communication device, the server, or others also downloads to all the communication devices 22-A to 22-C thus determined content of the computed bandwidth table.

Furthermore, in this embodiment, since the communication devices 22-A to 22-C can transmit some packet to all the other communication devices, values for the 'computed bandwidth' fields of all the records in the computed bandwidth tables 38-A to 38-C are set to be positive numbers as shown in FIG. 4.

However, the constitution of the present invention is not limited to this constitution, and as shown in FIG. 7 with halftone dot meshing added, for example, when traffic cannot occur between communication devices, out of the communication devices 22-A to 22-C, corresponding to either one of the permutations (or combinations), which consist of two elements, values for the 'computed bandwidth' fields of the corresponding records in the computed bandwidth tables 38-A to 38-C may be set at '0'.

Furthermore, in this embodiment, contracted bandwidths included in 'download requests' downloaded individually from the other communication devices are applied to obtain computed bandwidths.

However, these contracted bandwidths and computed bandwidths may be given as information stored in advance, for example, in a floppy disc or other storage media, or may be given under man-machine interface performed in maintenance and operation processes when necessary.

Figure 8:
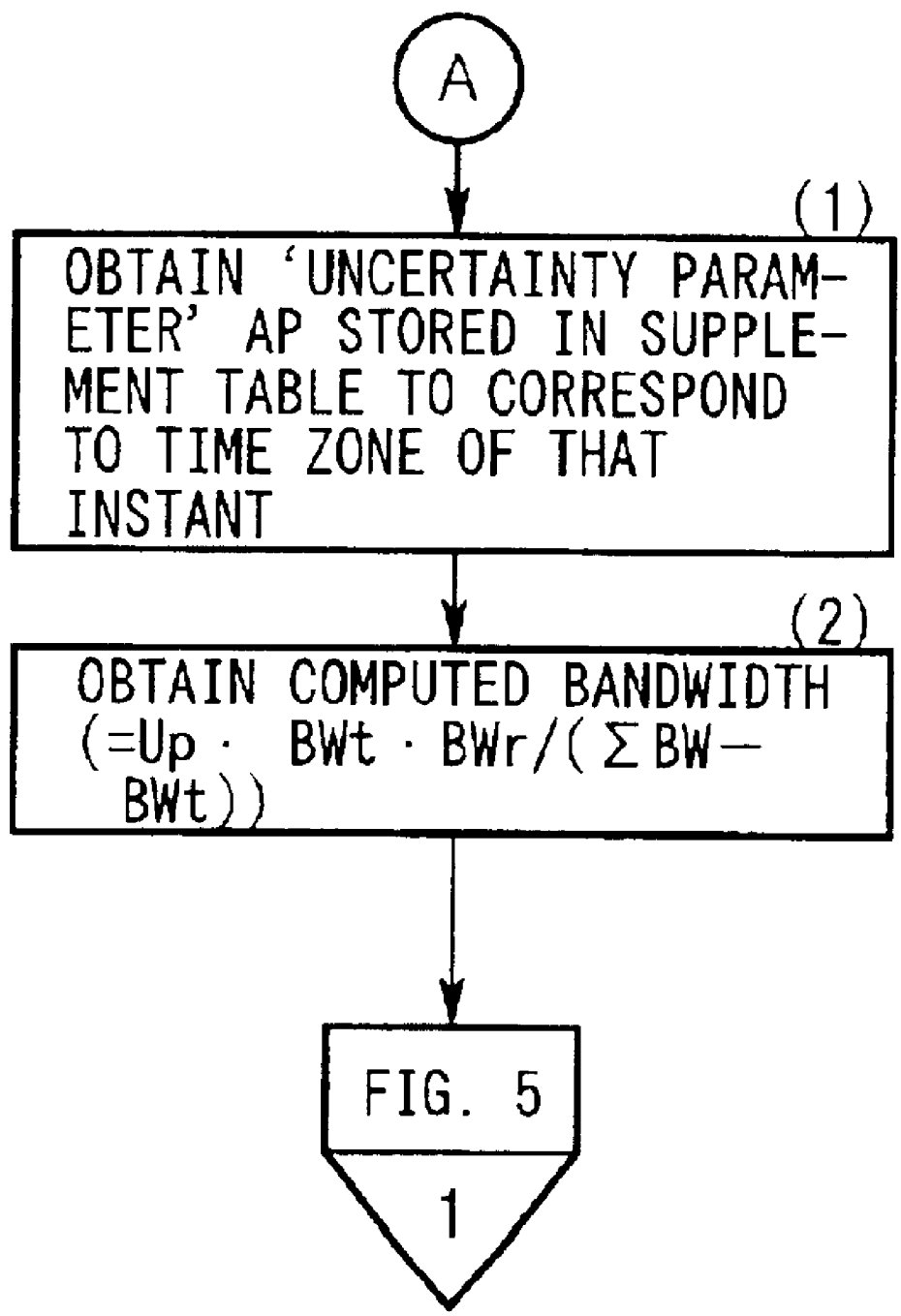
FIG. 8 is a flow chart showing an operation according to a second embodiment of the present invention.

FIG. 8 is an operational flow chart of a second embodiment according to the present invention.

The operations of the second embodiment according to the present invention are explained below referring to FIG. 2 to FIG. 4 and FIG. 8.

The characteristic of this embodiment lies in its arithmetic procedure performed by the bandwidth controlling part 34-z for obtaining computed bandwidths.

In the memory 33-Z provided in the communication device 22-Z, as shown in FIG. 9, a supplement table 39-Z is disposed in which 'uncertainty parameters' (uncertainty) Up, which are computed in advance as values for the following equation for a contracted bandwidth BWp of the communication device 22-Z and a bandwidth BWop included in the contracted bandwidth BWp and actually allotted to transmission of some transmission information, are registered for each of predetermined time zones p divided based on the distribution of traffic.

$$Up=(BWp-BWop)/BWop \qquad (2)$$

Similarly to the first embodiment, when the bandwidth controlling part 34-z recognizes that effective values for all the records in the contracted bandwidth table 37-z are stored or some record is updated, it obtains an 'uncertainty parameter' Up (supposed to be '1.5' to simplify the explanation here) stored in a supplement table 39-z to correspond to the time zone p of that instant (FIG. 8(1)).

The bandwidth controlling part 34-z then performs an arithmetic operation shown by the following equation (3) instead of the aforesaid equation (1) for a contracted bandwidth BWt of the aforesaid communication device 22-t (either one of the communication devices 22-A to 22-C) corresponding to a transmitting party, a contracted bandwidth BWr of the communication device 22-r (either one of the communication devices 22-A to 22-C) corresponding to a destination, and the sum total ΣBW of contracted bandwidths of all the communication devices 22-A to 22-C to obtain, together with the above 'uncertainty parameter' Up, computed bandwidths BWg to correspond individually to all the combinations of the communication devices and to be stored in 'transmitting/receiving end identifier' fields of the computed bandwidth table 38-z (FIG. 8 (2)).

$$BWg=Up \cdot BWt \cdot BWr/(\Sigma BW-BWt) \qquad (3)$$

Since processing procedures, which are performed in cooperation among each part, for applying the computed bandwidths BWg thus computed to transmission are the same as the procedures (FIG. 5 (4), (5)) in the first embodiment described above, the explanation thereof is omitted here.

In short, a bandwidth to be applied to transmission of a packet in any of the communication devices 22-A to 22-C is set at a value proportional to an 'uncertainty parameter', which is given in advance as a value appropriate for the distribution of traffic for each of the time zones p and set at a larger value as a surplus contracted bandwidth is larger.

Therefore, according to this embodiment, the surplus contracted bandwidth mentioned above is more effectively utilized for packets to be transmitted in respective time zones p and transmission quality is also improved compared with the first embodiment.

Incidentally, in this embodiment, the set of 'uncertainty parameters' obtained on the assumption that the distribution of traffic is the same among the communication devices 22-A to 22-C is registered in all of the supplement tables 39-A to 39-C.

However, the present invention is not limited to this constitution, and the values for both or either one of the time zone division and the 'uncertainty parameter' may be values appropriate for the distribution of traffic in individual communication devices 22-A to 22-C.

Furthermore, in this embodiment, the values for the 'uncertainty parameter' are obtained in advance as the results of the arithmetic operation of the above equation (2) and stored in the supplement table 39-Z.

However, the values for the 'uncertainty parameter' are not limited to the values obtained based on the above arithmetic operation, but may be given as any value as long as it is consistent with the distribution of traffic (a value obtained by actual measurement or obtained logically) in all or each of the communication devices 22-A to 22-C, and as long as it becomes at a larger value as a proportion of a surplus contracted bandwidth to the contracted bandwidth is larger.

Furthermore, in this embodiment, the values for the 'uncertainty parameter' are set individually in the communication devices 22-A to 22-C and for respective time zones p consistent with the distribution of traffic.

However, the values for the 'uncertainty parameter' may be set as constants when the distribution of traffic is considered to be constant and steady, and may be values common among the communication devices 22-A to 22-C when the distribution of traffic is the same among all of these communication devices 22-A to 22-C.

Operations of a third embodiment according to the present invention are explained below referring to FIG. 2 and FIG. 8.

The characteristic of this embodiment lies in the following processing procedures performed by the controlling parts 32-A to 32-C.

In the communication device 22-Z, the controlling part 32-Z cooperates with the interfacing part 31-Z, the TCP/IP part 35-Z, and the routing part 36-Z to monitor distribution fluctuation of traffic, congestion, failure and other events possibly occurring in both or either one of an edge network, which is formed between the communication device 22-Z and IP-VPN23, and that IP-VPN23.

Furthermore, every time such an event is recognized, a value for the 'uncertainty parameter' field in the record, out of the records in the supplement table 39-Z, corresponding to the time zone in which that event is recognized is updated to an appropriate value for this event by the controlling part 32-Z.

The bandwidth controlling part 34-z performs an arithmetic operation shown by the aforesaid equation (3) based on thus updated 'uncertainty parameter' Up to compute the aforesaid computed bandwidth BWg.

Thereby, surplus contracted bandwidths of the communication devices 22-A to 22-C are converted to values for the 'uncertainty parameter' indicating practical surpluses appropriate for the states of the network and IP-VPN23 described above, and applied in computing the above computed bandwidth BWg.

Therefore, according to this embodiment, the surplus contracted bandwidths are allotted to the communication devices 22-A to 22-C in a manner to flexibly adapt to incessantly changing operating statuses of each part, and thereby steady transmission rate and service quality can be maintained.

Incidentally, in this embodiment, the values for the 'uncertainty parameter' are updated every time the above-mentioned event occurs.

However, the 'uncertainty parameter' may be reset at a predetermined frequency or cycle, or updated at the start or the end of a time zone corresponding to the distribution of traffic or at the predetermined time, not limited to the instant of the occurrence of such an event.

Furthermore, in this embodiment, the above event and a manner in which the 'uncertainty parameter' is updated according to this event are not described.

However, the 'uncertainty parameter' may be updated in any manner, for example, as listed below, as long as the surplus contracted bandwidth increasing/decreasing according to an actual event is effectively utilized.

The 'uncertainty parameter' is updated to a larger value when some packet is discarded.

The 'uncertainty parameter' is updated to a smaller value as the frequency (congestion extent) at which such a packet is discarded is high.

Operations of a fourth embodiment according to the present invention are explained below referring to FIG. 2 and FIG. 3.

The characteristic of this embodiment lies in the following processing procedures performed by the bandwidth controlling parts 34-A to 34-C.

The bandwidth controlling part 34-z obtains a correction coefficient Cp for a predetermined positive number K shown by the following equation (4), and obtains a computed bandwidth BWg by performing an arithmetic operation shown by either one of the following equations (5) and (6) instead of the aforesaid equations (1) and (3).

$$Cp = K(BWt + BWr) \quad (4)$$

$$BWg = Cp \cdot BWt \cdot BWr / (\Sigma BW - BWt) \quad (5)$$

$$BWg = Cp \cdot Up \cdot BWt \cdot BWr / (\Sigma BW - BWt) \quad (6)$$

The value for the computed bandwidth BWg computed in this way becomes larger, as shown in the above equation (4), as the sum total of bandwidths BWt and BWr of the communication devices corresponding to a transmitting party and a destination is larger.

Therefore, according to this embodiment, a surplus contracted bandwidth is allotted to a communication device intrinsically demanding a high transmission rate with higher priority given or in a larger proportion.

Incidentally, in this embodiment, a surplus contracted bandwidth of a communication device corresponding to a transmitting party is allotted with higher priority given and in a larger proportion as a contracted bandwidth of a communication device corresponding to a destination is larger.

However, such a surplus contracted bandwidth may be allotted, for example, for each flow recognized in the process of communication control performed by the TCP/IP part 35-z and with a level of priority appropriate for the attribute of this flow being given to bring about consistency with a service class, or it may be weighted by a random number generated at a predetermined frequency so that improperly much amount is not allotted to a specific communication device or flow.

In the embodiments described above, a packet indicating a 'download request' is downloaded to all of the communication devices 22-A to 22-C via IP-VPN23.

However, such a 'download request' may be downloaded via a transmission path or a path other than IP-VPN23 laid between each one of the communication devices 22-A to 22-C.

Furthermore, in the embodiments described above, computed bandwidths are individually and asynchronously computed or updated by the communication devices 22-A to 22C.

However, the present invention is not limited to such a constitution, and all the computed bandwidths may be updated by these communication devices 22-A to 22-C synchronously, for example, at the predetermined time given by clocks which are individually provided in the communication devices 22-A to 22-C and corrected with a predetermined accuracy to avoid the problem of inappropriate allotment of the contracted bandwidths and other problems which possibly occur because the computed bandwidths are updated at different instants among individual communication devices.

When this constitution is applied, the following two planes (storage areas) may be provided in the contracted bandwidth table 37-Z and both or either one of the controlling part 32-Z and the bandwidth controlling part 34-Z may take the lead in switching these storage areas, so that even when the contracted bandwidths of the communication devices 22-A to 22-C are updated asynchronously to any value, surplus bandwidths of the contracted bandwidths are prevented from being allotted transitionally in an inappropriate manner:

a first plane for storing the combination of contracted bandwidths applied in computing the computed bandwidths stored previously in the computed bandwidth table 38-Z; and a second plane for storing as initial values the combination of the contracted bandwidths stored in the first plane, and storing all the values for the contracted bandwidths to be applied in updating the above computed bandwidths, in which the updating is done after the instant the initial values are stored.

Furthermore, in the embodiments described above, the present invention is applied in the communication devices 22-A to 22-C disposed as nodes of IP-VPN23.

However, the present invention is not limited to these communication devices 22-A to 22-C, and can be applicable to any node irrespective of the constitution of its network as long as it terminates a connectionless network by a layer 2 and is a node appropriate for a packet (message) switching system.

Furthermore, in the embodiments described above, the interfacing part 31-Z, the controlling part 32-Z, the memory 33-Z, the bandwidth controlling part 34-Z, the TCP/IP part 35-Z, and the routing part 36-Z provided in the communication device 22-Z are formed as an LSI or specialized hardware.

However, all or a part of the interfacing part 31-Z, the controlling part 32-Z, the memory 33-Z, the bandwidth controlling part 34-Z, the TCP/IP part 35-Z, and the routing part 36-Z may be formed as any modules as long as they can realize functional distribution and load distribution, or may be formed as a set of a single or a plurality of processor(s), which perform(s) predetermined processing based on a wired logic and a stored logic, and an I/O device operating under the control of this processor.

Furthermore, in the embodiments described above, the present invention is applied to IP-VPN (L3VPN).

However, the present invention is also applicable, not limited to the IP-VPN23 (L3VPN), to a network such as L2VPN configured under communication control performed in a data link layer at a frame level similarly in a network layer.

The invention is not limited to the above embodiments and various modifications may be made without departing from the spirit and scope of the invention. Any improvement may be made in part or all of the components.

What is claimed is:

1. A communication device comprising:
a storage section for storing all bandwidths allotted individually to a plurality of nodes, said nodes including a local station and accommodated in a connectionless network;
a bandwidth computing section
for obtaining from said storage section bandwidths BWt and BWr, which are allotted respectively to said local station and a destination included in said plurality of nodes, said local station being a transmitting party of transmission information, and also obtaining from said storage section a sum total $\Sigma BW$ of bandwidths allotted to all nodes other than the destination and
for computing a transmission bandwidth (=BWt·BWr/$\Sigma BW$) to be applied to transmission of the transmission information, based on these bandwidths BWt and BWr and the sum total $\Sigma BW$; and
a transmitting section for shaping said transmission information and transmitting the transmission information to said connectionless network within the range of the transmission bandwidth computed by said bandwidth computing section.

2. A communication device comprising:
a storage section for storing all bandwidths allotted individually to a plurality of nodes, said nodes including a local station and accommodated in a connectionless network;
a bandwidth computing section
in which uncertainty U is given in advance, said uncertainty U being a value for a monotone nondecreasing function of a ratio between a bandwidth allotted to said local station and a bandwidth included in the bandwidth allotted to the local station for transmitting any transmission information,
for obtaining from said storage section bandwidths BWt and BWr, which are allotted respectively to said local station and a destination included in said plurality of nodes, said local station being a transmitting party of transmission information, and also obtaining from said storage section a sum total $\Sigma BW$ of bandwidths allotted to all nodes other than the destination, and
for computing a transmission bandwidth (=U·BWt·BWr/$\Sigma BW$) to be applied to transmission of the transmission information, based on a uncertainty U, the bandwidths BWt and BWr, and the sum total $\Sigma BW$; and
a transmitting section for shaping said transmission information and transmitting the transmission information to said connectionless network within the range of the transmission bandwidth computed by said bandwidth computing section.

3. The communication device according to claim 1, further comprising
a bandwidth setting section
for notifying the bandwidth allotted in advance to said local station to nodes other than the local station included in the plurality of nodes, and
for storing in said storage section, together with the bandwidth allotted to the local station, bandwidths notified individually by said other nodes.

4. The communication device according to claim 2, further comprising
a bandwidth setting section
for notifying the bandwidth allotted in advance to said local station to nodes other than the local station included in the plurality of nodes, and
for storing in said storage section, together with the bandwidth allotted to the local station, bandwidths notified individually by said other nodes.

5. The communication device according to claim 1, further comprising
a bandwidth setting section
for receiving bandwidths respectively allotted to said plurality of nodes in advance and downloaded by a predetermined device and
for storing said received bandwidths in said storage section.

6. The communication device according to claim 2, further comprising
a bandwidth setting section
for receiving bandwidths respectively allotted to said plurality of nodes in advance and downloaded by a predetermined device and
for storing said received bandwidths in said storage section.

7. The communication device according to claim 1, further comprising
a bandwidth setting section for storing in said storage section bandwidths respectively allotted in advance to said plurality of nodes and stored in a predetermined storage medium.

8. The communication device according to claim 2, further comprising
a bandwidth setting section for storing in said storage section bandwidths respectively allotted in advance to said plurality of nodes and stored in a predetermined storage medium.

9. The communication device according to claim 1, further comprising
a bandwidth setting section
for adopting man-machine interface related to the setting of bandwidths to be allotted respectively to all or a part of said plurality of nodes and
for storing in said storage section the bandwidths set under the man-machine interface.

10. The communication device according to claim 2, further comprising
a bandwidth setting section
for adopting man-machine interface related to the setting of bandwidths to be allotted respectively to all or a part of said plurality of nodes and
for storing in said storage section the bandwidths set under the man-machine interface.

11. The communication device according to claim 2, further comprising
an uncertainty updating section for updating said uncertainty U according to one of an event occurring in said connectionless network, and distribution of traffic in the network, and
wherein said bandwidth computing section computes said transmission bandwidth by applying said uncertainty U updated by said uncertainty updating section.

12. The communication device according to claim 11, wherein
said uncertainty updating section updates said uncertainty U at a predetermined frequency or cycle.

13. The communication device according to claim 11, wherein
said uncertainty updating section obtains from said storage section the bandwidths BWr, BWt, which are allotted respectively to a node to be the destination of said transmission information and said local station out of the plural nodes, and sets the uncertainty U at a value weighted larger as the sum total of these bandwidths BWr, BWt is larger.

14. The communication device according to claim 11, wherein
said uncertainty updating section sets the uncertainty U at a value weighted conforming to the attribute of a flow of a packet including the transmission information to be transmitted.

15. The communication device according to claim 3, wherein
said bandwidth setting section notifies of said bandwidth allotted to said local station to the nodes other than said local station, every time this bandwidth is updated.

16. The communication device according to claim 4, wherein
said bandwidth setting section notifies of said bandwidth allotted to said local station to the nodes other than said local station, every time this bandwidth is updated.

17. The communication device according to claim 3, wherein:
a transmission path or a path, different from said connectionless network, is formed between said bandwidth setting section and the nodes other than said local station, of said plurality of nodes; and
said bandwidth setting section notifies said bandwidth allotted to said local station to said other nodes via said transmission path or said path.

18. The communication device according to claim 4, wherein:
a transmission path or a path, different from said connectionless network, is formed between said bandwidth setting section and the nodes other than said local station, of said plurality of nodes; and
said bandwidth setting section notifies said bandwidth allotted to said local station to said other nodes via said transmission path or said path.

19. The communication device according to claim 15, wherein:
a transmission path or a path, different from said connectionless network, is formed between said bandwidth setting section and the nodes other than said local station, of said plurality of nodes; and
said bandwidth setting section notifies said bandwidth allotted to said local station to said other nodes via said transmission path or said path.

20. The communication device according to claim 16, wherein:
a transmission path or a path, different from said connectionless network, is formed between said bandwidth setting section and the nodes other than said local station, of said plurality of nodes; and
said bandwidth setting section notifies said bandwidth allotted to said local station to said other nodes via said transmission path or said path.

21. The communication device according to claim 1, further comprising
a clocking section for timing and giving time, and wherein
said bandwidth computing section applies a combination of updated bandwidths, stored in said storage section, to computing of said transmission bandwidth, on or after the predetermined time given by said clocking section.

22. The communication device according to claim 2, further comprising
a clocking section for timing and giving time, and wherein
said bandwidth computing section applies a combination of updated bandwidths, stored in said storage section, to computing of said transmission bandwidth, on or after the predetermined time given by said clocking section.

23. The communication device according to claim 1, wherein:
said storage section has individual storage areas for individually storing a combination of updated bandwidths applied in computing the transmission bandwidth by said bandwidth computing section and a succeeding combination added alteration to said combination; and
said bandwidth computing section applies said succeeding combination, included in the combinations stored in said storage section, to computing of said transmission bandwidth.

24. The communication device according to claim 1, wherein:
said storage section has individual storage areas for individually storing a combination of updated bandwidths applied in computing the transmission bandwidth by said bandwidth computing section and a succeeding combination added alteration to said combination; and
said bandwidth computing section applies said succeeding combination, included in the combinations stored in said storage section, to computing of said transmission bandwidth.

25. A bandwidth management method comprising the steps of:
obtaining bandwidths BWt and BWr, which are allotted respectively to nodes to be a transmitting party and a destination of transmission information, of a plurality of nodes accommodated in a connectionless network, and also obtaining a sum total of bandwidths $\Sigma BW$ allotted to nodes other than the destination;
computing a transmission bandwidth ($=BWt \cdot BWr/\Sigma BW$) to be applied to transmission of said transmission information based on said bandwidths BWt and BWr and the sum total $\Sigma BW$; and
transmitting said transmission information to said connectionless network within a range of said computed transmission bandwidth after shaping said transmission information.

26. A bandwidth management method comprising the steps of:

obtaining bandwidths BWt and BWr, which are allotted respectively to nodes to be a transmitting party and a destination of transmission information, of a plurality of nodes accommodated in a connectionless network, and also obtaining a sum total of bandwidths $\Sigma BW$ allotted to all nodes other than the destination;

computing a transmission bandwidth ($=U \cdot BWt \cdot BWr/\Sigma BW$) to be applied to transmission of said transmission information based on an uncertainty U, the bandwidths BWt and BWr, and the sum total of the bandwidths $\Sigma BW$, said uncertainty U being a value for a monotone nondecreasing function of a ratio between a bandwidth allotted to said transmitting party and a bandwidth included in the bandwidth allotted to the transmission information for transmitting any transmission information; and transmitting the transmission information to the connectionless network within a range of the computed transmission bandwidth after shaping said transmission information.

* * * * *